Figure 1:
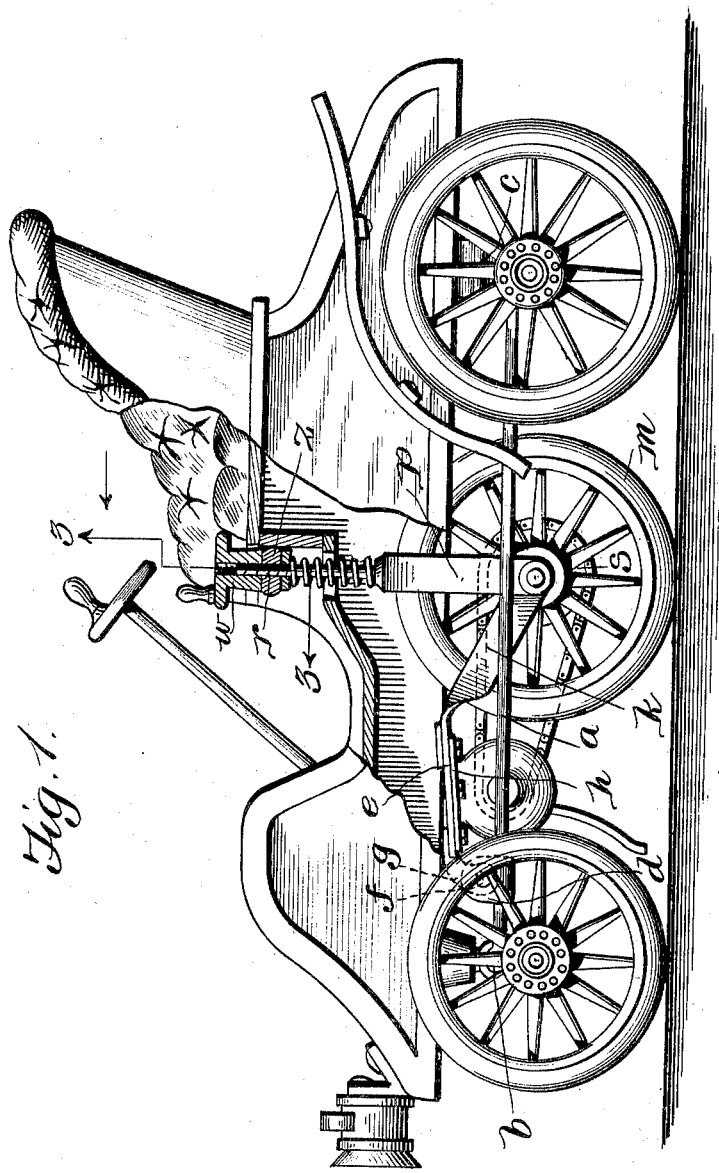

No. 811,403. PATENTED JAN. 30, 1906.
A. INGLIS.
MOTOR VEHICLE.
APPLICATION FILED JUNE 27, 1905.

2 SHEETS—SHEET 1.

Witnesses
Robt. A. Boswell.
George M. Anderson.

Inventor
Alexander Inglis
By E. W. Anderson
his Attorney

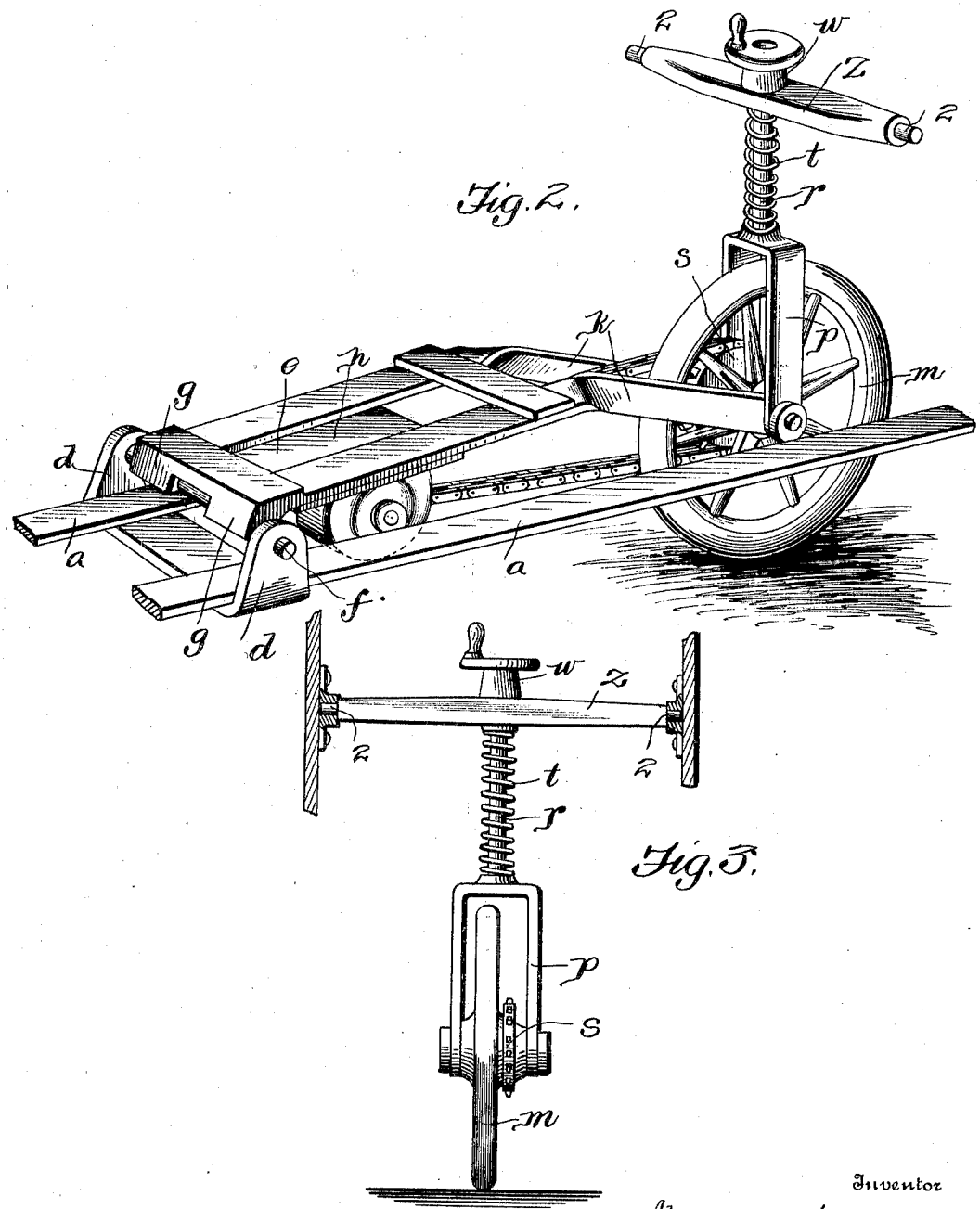

UNITED STATES PATENT OFFICE.

ALEXANDER INGLIS, OF INDIANAPOLIS, INDIANA.

MOTOR-VEHICLE.

No. 811,403. Specification of Letters Patent. Patented Jan. 30, 1906.

Application filed June 27, 1905. Serial No. 267,184.

*To all whom it may concern:*

Be it known that I, ALEXANDER INGLIS, a citizen of the United States, and a resident of Indianapolis, in the county of Marion and State of Indiana, have made a certain new and useful Invention in Motor-Vehicles; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1 is a side elevation of a motor-vehicle, partly broken away, having my invention applied thereto. Fig. 2 is a perspective view of my improvements shown in connection with parts of the motor-vehicle. Fig. 3 is a front view of the same.

The invention has relation to driving attachments for vehicles; and it consists in the novel construction and combination of parts, as hereinafter set forth.

In the accompanying drawings, illustrating the invention, the letter $a$ designates the reach-rods of a vehicle, $b$ the front axle, and $c$ the rear axle.

Attached to the reach-bars or to the running-gear in the median line are brackets $d$ for the pivotal connection of an attachment-frame $e$, which extends longitudinally and centrally of the frame. In the construction illustrated a pivot-rod $f$ extends between the brackets $d$, to which its ends are connected, and on this rod are seated the journal-bearings $g$ of the attachment-frame. This frame may be located either above or below the level of the reach. As shown, its front portion is above the reach-rods, having a plane part or platform $h$ for the attachment of a motor and having extension-arms $k$, to the ends of which are pivoted the journal of the drive-wheel $m$ and the lower ends of the arms of the fork $p$. Usually this wheel is designed to be located between the reach-rods in front of the rear axle.

The drive-wheel is provided with a sprocket-wheel $s$, which is designed to be connected to the sprocket-wheel of a motor secured to the attachment-frame.

The fork $p$ extends upward and is provided with a stem $r$, having a pressure-spring $t$ bearing against a shoulder or projection of the fork and against a transverse bearing-bar $z$, which is provided with journal ends 2, which are designed to bear in suitable boxings of the body portion of the vehicle. The stem $r$ passes through a seat in the bearing-bar, and its upper end is threaded for engagement with an adjusting-nut $w$. When the nut is turned to raise the stem, the fork and the drive-wheel connected thereto will be lifted so that this wheel will be carried clear of the ground. Reversing the operation of the nut will lower the wheel for action on the ground. The spring on the fork is designed to ease irregular motions of the wheel caused by uneven ground and to allow vertical play of the wheel, so that it will be held to the ground in an elastic manner.

This attachment is designed to be applied to a vehicle for the purpose of driving it by means of a motor, which may be of electric or gasolene type, or the drive-wheel may be geared up in junior wagons for foot-power. This drive-wheel is designed to act independently of the supporting-wheels of the vehicle, which, however, enables the operator to raise it from the ground when its operation is not desirable—as, for instance, when vehicle-shafts are connected for a horse.

Having described the invention, what I claim, and desire to secure by Letters Patent, is—

1. A motor-vehicle, having a motor-carrying frame provided with a pivotal connection with the running-gear, an upright fork pivoted to said frame and carrying a drive-wheel having a driving connection with the motor, a transverse bearing-bar having a pivotal connection at its ends with the vehicle-body, said fork having a stem engaging an aperture of said transverse bearing-bar, means in engagement with the stem of the fork for adjusting the frame, and a spring for pressing the drive-wheel to the ground, substantially as specified.

2. A motor-vehicle having a motor-carrying frame provided with a pivotal connection with the running-gear, an upright fork pivoted to said frame and carrying a drive-wheel having a driving connection with the motor, a transverse bearing-bar having a pivotal connection at its ends with the vehicle-body, said fork having a stem engaging an aperture of said transverse bearing-bar, means in engagement with the stem of the fork for adjusting the frame, a spring for pressing the drive-wheel to the ground, and means independent of said frame for steering the vehicle, substantially as specified.

3. A motor-vehicle, having a motor-carrying frame provided with a pivotal connection with the running-gear, an upright fork pivoted to one end of said frame and carrying a drive-wheel having a driving connection with the motor, a transverse bearing-bar having a pivotal connection at its ends with the vehicle-body, said fork having a threaded stem engaging an aperture of the bearing-bar, a spring between said fork and bearing-bar upon the stem, and an adjusting-nut resting upon said bearing-bar and engaging the stem, substantially as specified.

4. A motor-vehicle having a motor-carrying frame provided with a pivotal connection with the running-gear, a drive-wheel journaled at the outer end of said frame, upright means connected to the axle of said wheel, for adjusting the same, said means having a pivotal supporting connection with the body of the vehicle, and a spring for pressing the drive-wheel to the ground, substantially as specified.

5. A motor-vehicle having a motor-carrying frame provided with a pivotal connection with the running-gear, a drive-wheel journaled at the outer end of said frame, upright means connected to the axle of said wheel for adjusting the same, said means including a transverse supporting-bar having a pivotal connection at its ends with the body of the vehicle, and a spring for pressing the drive-wheel to the ground, substantially as specified.

In testimony whereof I affix my signature in presence of two witnesses.

ALEXANDER INGLIS.

Witnesses:
 WILLIAM H. DAGGETT,
 FRANCIS A. CARVIN.